United States Patent
Odenwalder

(12) 
(10) Patent No.: US 6,603,751 B1
(45) Date of Patent: Aug. 5, 2003

(54) METHOD AND SYSTEM FOR PERFORMING A HANDOFF IN A WIRELESS COMMUNICATION SYSTEM, SUCH AS A HARD HANDOFF

(75) Inventor: Joseph P. Odenwalder, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/248,701

(22) Filed: Feb. 11, 1999

Related U.S. Application Data
(60) Provisional application No. 60/074,733, filed on Feb. 13, 1998.

(51) Int. Cl.[7] .............................. H04Q 7/00; H04B 7/00
(52) U.S. Cl. ..................... 370/331; 455/436; 455/442; 455/522
(58) Field of Search ................................. 370/311, 328, 370/329, 300–333, 335, 342, 343, 252; 455/436–444, 69, 522, 455

(56) References Cited

U.S. PATENT DOCUMENTS

| | | | |
|---|---|---|---|
| 5,751,725 A | 5/1998 | Chen ........................... | 371/5.5 |
| 5,999,816 A | * 12/1999 | Tiedemann, Jr. et al. ... | 455/437 |
| 6,078,570 A | * 6/2000 | Czaja et al. ................. | 370/331 |
| 6,134,440 A | * 10/2000 | Black ........................ | 455/436 |
| 6,144,649 A | * 11/2000 | Storm et al. ................ | 370/335 |
| 6,181,943 B1 | * 1/2001 | Kuo et al. ................... | 455/437 |
| 6,185,431 B1 | * 2/2001 | Li et al. ...................... | 455/522 |

FOREIGN PATENT DOCUMENTS

| | | | |
|---|---|---|---|
| EP | 0667726 | 2/1995 | ............ H04Q/7/38 |
| WO | 9729611 | 8/1997 | ............ H04Q/7/38 |
| WO | WO 97/40592 | * 10/1997 | ............ H04B/7/26 |

OTHER PUBLICATIONS

"A Novel Method for CDMA Hard Handoff" by Prasanna Satarasinghe, Northern Telecom Wireless Networks; Nov. 18, 1996, IEEE 1996, pp. 1766–1768.

* cited by examiner

*Primary Examiner*—Duc M. Nguyen
(74) *Attorney, Agent, or Firm*—Philip Wadsworth; Kent D. Baker

(57) ABSTRACT

A method for minimizing search time and disruption of current service on an originating frequency during a frequency search excursion to a target frequency as part of an inter-frequency hard handoff between cells on different RF CDMA channels. In one embodiment, the method for minimizing search time includes tuning a selected mobile station to a target frequency and collecting chip samples, which are stored in a memory buffer, but not performing pilot searches and pilot strength measurements while on the target frequency; tuning the selected mobile station back to the original frequency and simultaneously resuming reception of forward link and transmission of reverse link and processing the samples collected on the target frequency to calculate pilot strength measurements from the target frequency. A method for minimizing disruption of service on the current frequency during the frequency search excursion to the target frequency includes increasing the amount of power allocated to other symbols of the frame impacted by the search excursion as a function of the search excursion time.

33 Claims, 7 Drawing Sheets

INTER-FREQUENCY SEARCH EXCURSION TIMING

FORWARD LINK POWER CONTROL INCREASE DURING SEARCH EXCURSION

REVERSE LINK POWER INCREASE DURING SEARCH VISIT

METHOD AND SYSTEM FOR PERFORMING A HANDOFF IN A WIRELESS COMMUNICATION SYSTEM, SUCH AS A HARD HANDOFF

CROSS-REFERENCE TO RELATED APPLICATION

This application claims the benefit of U.S. Provisional Patent Application No. 60/074,733 filed Feb. 13, 1998, entitled METHOD AND APPARATUS FOR INTERFREQUENCY HARD HANDOFF, where this provisional application is incorporated by reference.

FIELD OF THE INVENTION

The invention relates to wireless communication system, and, more particularly, to methods and apparatus for providing hard handoffs between cells in such systems.

BACKGROUND OF THE INVENTION

In a code division multiple access (CDMA) system, the vast majority of handoffs happen between cells on the same CDMA channel and use soft handoff procedures. On some occasions, the mobile stations need to perform a handoff between cells on different CDMA channels where such channels are at different radio frequencies (FR), often denoted as inter-frequency hard handoff. Such situations are typically, but not limited to, either a handoff between different operators, a handoff between different RF channels allocated for capacity reasons, or a handoff between different signal modulation technologies.

Before effecting an inter-frequency hard handoff, the mobile station is directed by the base station to tune to the new target frequency, measure the radio environment (e.g., pilot signal strength of the received signals, etc.), and report the measurement back to the base station. Such a procedure is specified in TIA/EIA-95-B and greatly enhances the probability of success of an inter-frequency handoff.

An essential requirement of the measurement on the target frequency, often referred to as "search excursion," is to minimize the disruption of the current service on the originating frequency. Handoffs to a second frequency without adequate prior sampling could result in poor signal performance. On the other hand, sampling for long periods of time may cause the signal at the first frequency to be lost completely. The method described below permits the mobile station to minimize the search time and to limit the disruption of service.

SUMMARY OF THE INVENTION

The invention overcomes the limitations described above, and provides additional benefits by providing a method and apparatus that minimizes the search time to another frequency and limits the disruption of service. This method is applicable to all types of services (voice, packet data, circuit data, signaling) the mobile station is connected to, and does not depend on the number of dedicated code channels assigned on the forward link and the reverse link.

One aspect of the invention involves receiving a frequency change command at a user station, such as a mobile station, to switch from receiving a signal on a first frequency to receiving a signal on a target frequency; tuning the mobile station to the target frequency and collecting and storing signal samples; tuning the mobile station to the first frequency and processing the signal samples; and transmitting signal sample processing results to a base station.

In accordance with another embodiment of the invention, a wireless communication system is disclosed herein that includes a user station, such as a mobile station, having at least a transmitter circuit, a receiver circuit, and a memory buffer. The mobile station is configured to receive a frequency change command from a base station to switch to a target frequency, to tune to the target frequency and collect and store signal samples in the memory buffer, to tune back to a first frequency and process the stored signal samples, and to transmit sample processing results to the base station. The mobile station can be further configured to minimize the loss of forward and reverse link symbols during switching to the target frequency by increasing the amount of power allocated to the other symbols of a frame impacted by the switch to the target frequency. The additional amount of power to be allocated to the symbols not impacted by the switch to the target frequency for the frame to be demodulated is a function of the time the mobile station is at the target frequency.

BRIEF DESCRIPTION OF THE DRAWINGS

In the figures, like reference numbers identify similar elements. For ease in identifying the discussion of any particular element, the most significant digit in a reference number refers to the figure number in which that element is first introduced (e.g., element 204 is first introduced and discussed with respect to FIG. 2).

DETAILED DESCRIPTION OF THE PREFERRED EMBODIMENTS

A wireless communication system, and, in particular, a method and apparatus for minimizing search excursion time to a target frequency and disruption of current service on an originating frequency is described in detail herein. In the following description, numerous specific details are provided to give a thorough understanding of the invention. One skilled in the relevant technology, however, will readily recognize that the invention can be practiced without these specific details or with alternative elements or steps. In other instances, well-known structures and methods are not shown in detail to avoid obscuring the invention.

Figure 1:
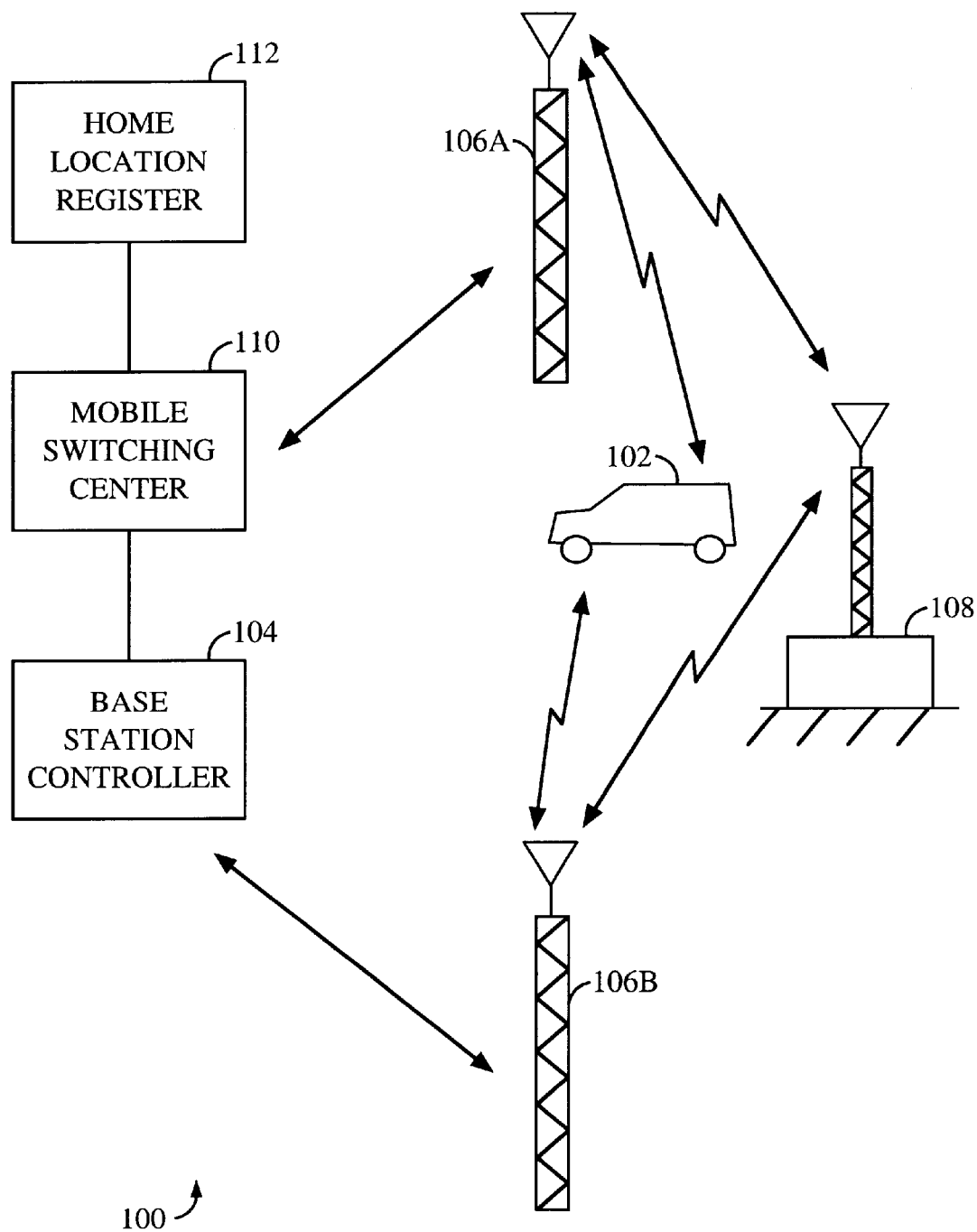
FIG. 1 illustrates a typical wireless communication system that can employ the invention.

FIG. 1 illustrates a cellular subscriber communication system 100 that uses multiple access techniques, such as code division multiple access (CDMA) for communicating between users of user stations (e.g., mobile telephones) and cell sites or base stations. In FIG. 1, a mobile user station 102 communicates with a base station controller 104 by means of one or more base stations 106a, 106b, etc. Similarly, a fixed user station 108 communicates with the base station controller 104, but by means of only one or more predetermined and proximate base stations, such as the base stations 106a and 106b.

The base station controller 104 is coupled to and typically includes interface and processing circuitry for providing system control to the base stations 106a and 106b. The base station controller 104 may also be coupled to and communicate with other base stations, and possibly even other base station controllers. The base station controller 104 is coupled to a mobile switching center 110 that in turn is coupled to a home location register 112. During registration of each user station at the beginning of each call, the base station controller 104 and the mobile switching center 110 compare registration signals received from the user stations to data contained in the home location register 112, as is known in the art. Handoffs may occur between the base station controller 104 and other base controllers, and even between the mobile switching center 110 and other mobile switching centers, as is known by those skilled in this technology.

When the system 100 processes voice or data traffic calls, the base station controller 104 establishes, maintains, and terminates the wireless link with the mobile station 102 and the fixed station 108, while the mobile switching center 110 establishes, maintains, and terminates communications with a public switched telephone network (PSTN). While the discussion below focuses on signals transmitted between the base station 106a and the mobile station 102, those skilled in this technology will recognize that the discussion equally applies to other base stations and to the fixed station 108. The terms "cell" and "base station" are generally used interchangeably herein.

Figure 2:
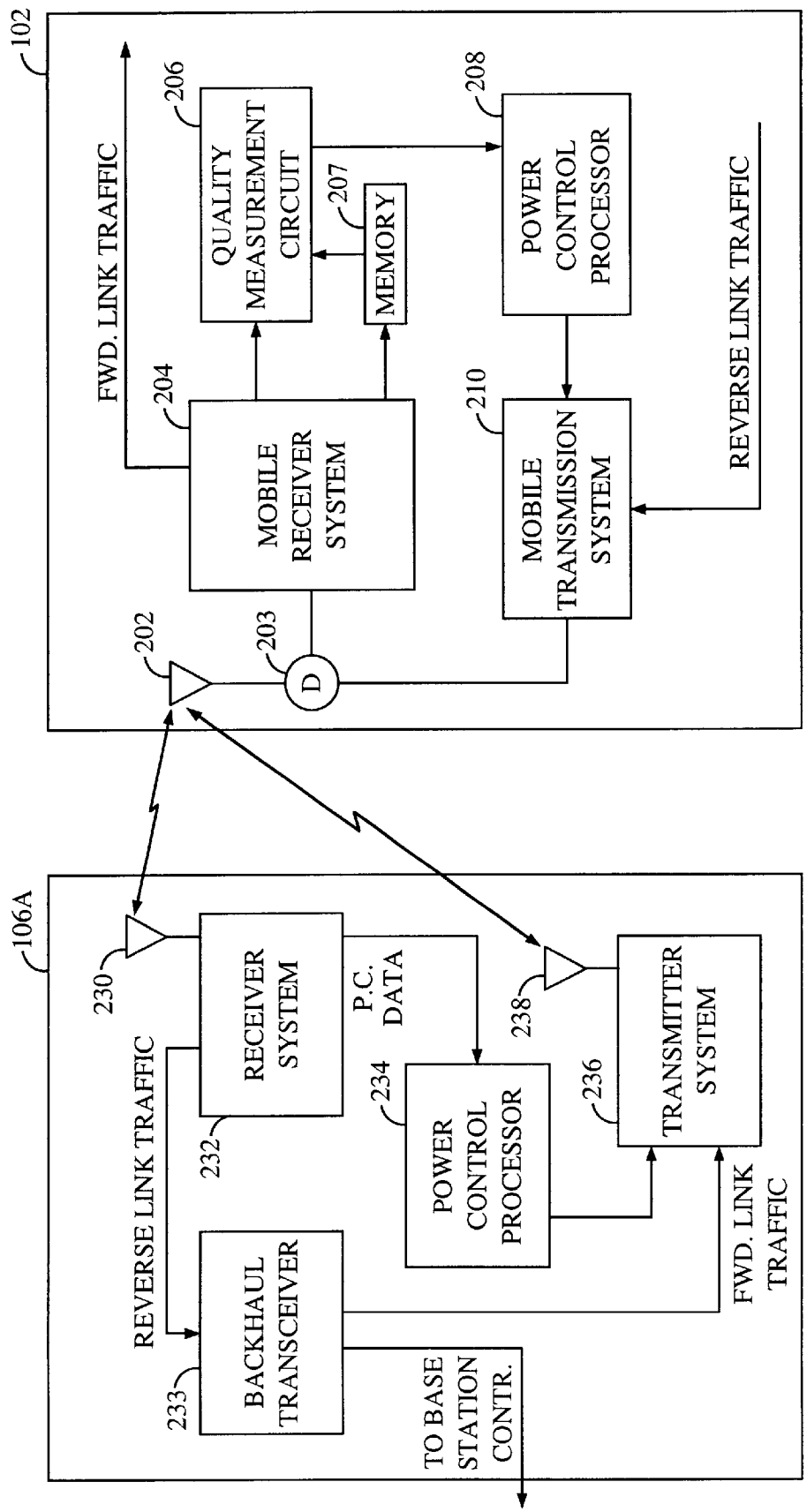
FIG. 2 is a block diagram of typical components found in the wireless communication system of FIG. 1 that can employ the invention.

Referring to FIG. 2, the mobile station 102 includes an antenna 202 that transmits signals to, and receives signals from the base station 106a. A duplexer 203 provides a forward link channel or signal from the base station 106a to a mobile receiver system 204. The receiver system 204 down-converts, demodulates, and decodes the received signal. The receiver system 204 then provides a predetermined parameter or set of parameters to a quality measurement circuit 206. Examples of parameters might include measured signal to noise ratio (SNR), measured received power, or decoder parameters such as symbol error rate, Yamamoto metric, or parity bit check indication. A memory buffer 207 can be included for use with the invention described herein. Additional details regarding operation of the mobile station 102 (and the base station 106a) are found, for example, in U.S. Pat. No. 5,751,725, entitled "METHOD AND APPARATUS FOR DETERMINING THE RATE OF RECEIVED DATA IN A VARIABLE RATE COMMUNICATION SYSTEM," assigned to the assignee of the present invention, and incorporated by reference herein.

The quality measurement circuit 206 receives the parameters from the receiver system 204 and determines a quality measurement signal or power level of the received signal. The quality measurement circuit 206 can generate energy per bit ($E_b$) or energy per symbol ($E_s$) measurements from portions or windows of each frame. Preferably, the energy per bit or energy per symbol measurements are normalized (e.g., $E_b/N_o$), or normalized and include interference factors (e.g., $E_b/N_t$), as is known in the art. Based on these measurements, the quality measurement circuit 206 produces a power level signal.

A power control processor 208 receives the power level signal from the quality measurement circuit 206, compares the signal to a threshold, and produces a power control message based on the comparison. Each power control message can indicate a change in power for the forward link signal. Alternatively, power control processor 208 produces power control messages representing the absolute power of the received forward link signal, as is known in the art. The power control processor 208 produces preferably several (e.g., sixteen) power control messages in response to several power level signals per frame. While the quality measurement circuit 206 and power control processor 208 are generally described herein as separate components, such components can be monolithically integrated, or the operations performed by such components can be performed by a single microprocessor.

A mobile transmission system 210 encodes, modulates, amplifies, and up converts the power control messages, via the duplexer 203 and the antenna 202. In the illustrated embodiment, the mobile transmission system 210 provides the power control message in a predetermined location of an outgoing reverse link frame.

The mobile transmission system 210 also receives reverse link traffic data, such as voice or general computer data, from the user of the mobile station. The mobile transmission system 210 requests a particular service (including power/rate) from the base station 106a based on the traffic data to be transmitted. In particular, the mobile transmission system 210 requests bandwidth allocation appropriate for the particular service. The base station 106a then schedules or allocates bandwidth (power/rate) resources based on requests from the mobile station 102 and other users to optimize such resource allocation, given power constraints of the system. Thus, effectively managing transmission power in the system will permit more effective bandwidth use.

The base station 106a includes a receiving antenna 230 that receives the reverse link frames from the mobile station 102. A receiver system 232 of the base station 106a down converts, amplifies, demodulates, and decodes the reverse link traffic. A backhaul transceiver 233 receives and forwards to the base station controller 104 reverse link traffic. The receiver system 232 also separates the power control messages from each reverse link traffic frame and provides the power control messages to a power control processor 234.

The power control processor 234 monitors the power control messages and produces a forward link transmitter power signal to a forward link transmitter system 236. The forward link transmitter system 236, in response thereto, either increases, maintains, or decreases the power of the forward link signal. The forward link signal is then transmitted via a transmitting antenna 238. Additionally, the power control processor 234 analyzes the quality of the reverse link signal from the mobile station 102 and provides appropriate feedback control messages to the forward link transmitter system 236. The forward link transmitter system 236, in response thereto, transmits the feedback control messages via the transmitting antenna 238 over the forward link channel to the mobile station 102. The transmitter system 236 also receives forward link traffic data from the base station controller 104 via the backhaul transceiver 233. The forward link transmitter system 236 encodes, modulates, and transmits via the antenna 238 the forward link traffic data.

Unless described otherwise herein, the construction and operation of the various blocks and elements shown in FIGS. 1 and 2 and the other figures are of conventional design and operation. Thus, such blocks or elements need not be described in further detail because they will be understood by those skilled in the relevant art. Any additional description is omitted for brevity and to avoid obscuring the detailed description of the invention. Any modifications necessary to the blocks of the communication system 100 of FIGS. 1 and 2, or the other systems shown therein can be readily made by one skilled in the relevant art based on the detailed description provided herein.

The closed-loop power control system for user stations, including the mobile station 102 and base station 106*a*, dynamically adjusts the transmit power for each user based on the user's propagation conditions to yield the same frame error rate (FER) for each user for voice services (e.g., a 1% FER). As noted above, many users, however, may request transmission for data services in lieu of voice services, such as facsimile, e-mail and general computer data, all of which are insensitive to delay but require a lower FER (or lower bit error rate (BER)). A user may even require video services, which not only require a lower FER but are sensitive to delay. The base station 106*a* dynamically assigns transmission rates based on requests from each user under known techniques.

Under one CDMA standard, described in the Telecommunications Industry Association's *TIA/EIA-95-A Mobile Stations-Base Station Compatibility Standard For Dual-Mode Wideband Spread Spectrum Cellular System*, each base station transmits pilot, sync, paging, and forward traffic channels to its users. The pilot channel is an unmodulated, direct-sequence spread spectrum signal transmitted continuously by each base station. The pilot channel enables each user to acquire the timing of the channels transmitted by the base station, and it provides a phase reference for coherent demodulation. The pilot channel also provides a means for signal strength comparisons between base stations to determine when to hand off between base stations (such as when moving between cells). Recent CDMA modulation techniques have been proposed using dedicated time multiplexed ("DTMP") pilot symbols. Under the DTMP approach, separate pilot symbols are time multiplexed on each user's traffic channel. Each user sequentially de-spreads the pilot symbols (and information symbols). There is also an alternative common code multiplexed pilot ("CCMP") approach, where one co-channel is dedicated to broadcasting a pilot signal. No pilot symbols are multiplexed with dedicated channels, and all users de-spread both the pilot symbols and the modulated information signals in parallel. Such systems are described in more detail in U.S. Pat. No. 6,310,869, filed Aug. 31, 1998, entitled METHOD AND APPARATUS FOR REDUCING AMPLITUDE VARIATIONS AND INTERFERENCE IN COMMUNICATION SIGNALS, SUCH AS WIRELESS COMMUNICATION SIGNALS EMPLOYING INSERTED PILOT SYMBOLS, assigned to the same assignee of this invention.

Inter-Frequency Search

Figure 3:
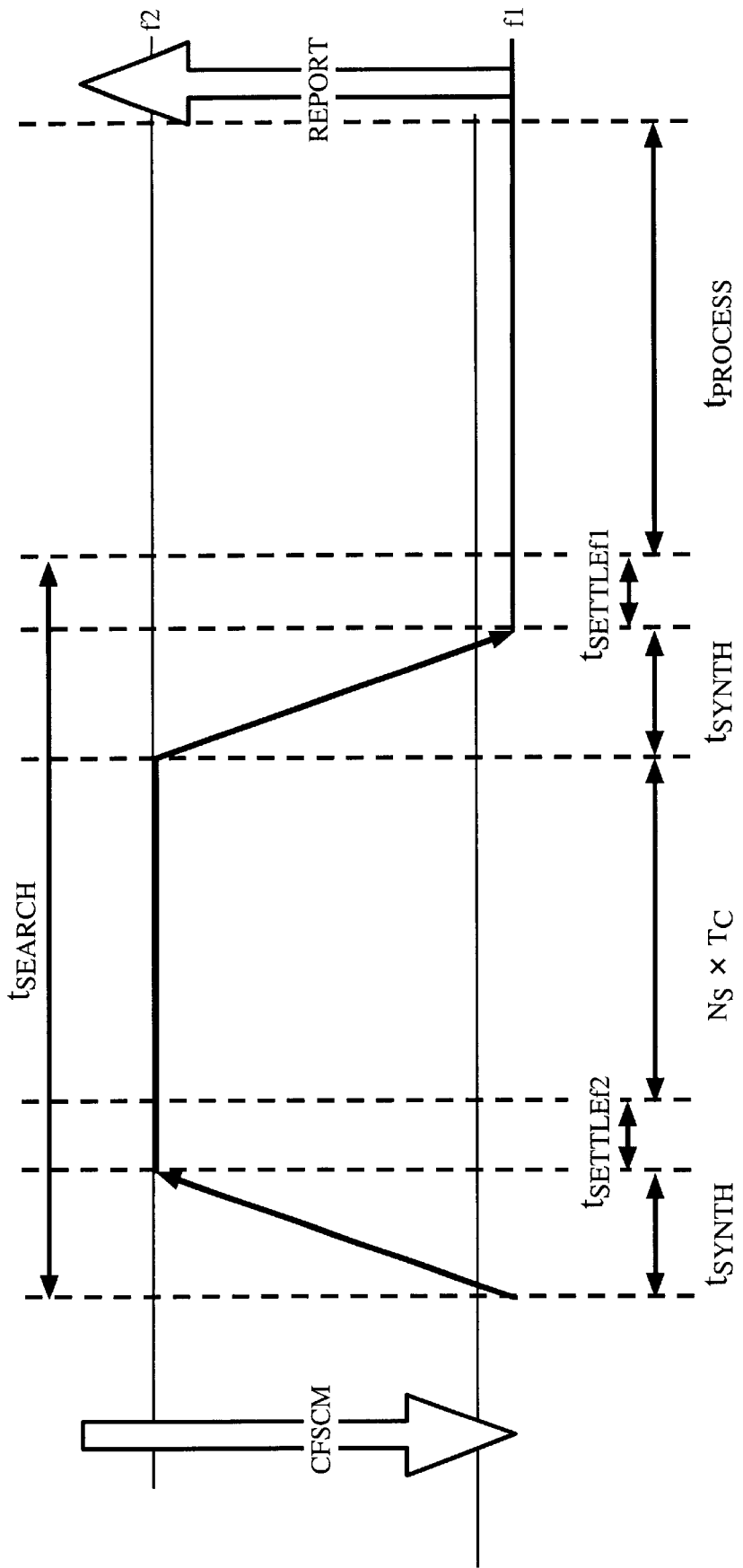
FIG. 3 is a timing diagram of an inter-frequency search excursion.

Referring next to FIG. 3, shown therein is a diagram of the different timing involved in performing a search excursion. While FIG. 3 would be self-explanatory to one of ordinary skill in the relevant art, a brief explanation is provided. The reference $t_{search}$ corresponds to the time required to collect the N samples on frequency f2. The total time will be $t_{search}$ plus the time it takes to process the samples after returning to the original frequency f1. The times $t_{synth}$ and $t_{settle}$ correspond to the time required to switch and settle at a new frequency, respectively. The time period of $N_s \times T_c$ represents the sampling time for $N_{samples}$, and $t_{process}$ represents the time to process the samples.

A method for minimizing the search time to another frequency can be described as follows:

First, the mobile station is currently demodulating an original or first frequency f1. An inter-frequency hard handoff to a target frequency f2 might be required, such as when certain signal quality measurements (e.g., those noted above) fall below predetermined thresholds. When reporting such dropping quality to the base station 106*a*, the mobile station 102 is directed by the base station (e.g., via a Candidate Frequency Search Request/Control Message ("CFSCM")) to perform a search excursion to a target frequency f2.

The mobile station tunes to frequency f2 and collects N chip samples (a chip being one bit of pseudonoise at, for example, 1024 bps for orthogonally encoded symbols). The samples are stored in a memory buffer; the mobile station does not perform pilot searches and pilot strength measurements while on frequency f2. The mobile station tunes back to the original frequency f1, resumes reception of forward link and transmission of reverse link, and processes the N samples collected on frequency f2 simultaneously.

The mobile station processes the samples collected on frequency f2 using a searcher that processes the stored samples while simultaneously processing the signal received on the original frequency f1. The mobile station reports to the base station the corresponding pilot strength measurements from frequency f2. One of skill in this technology will recognize the searcher referred to above and would have the requisite skill to provide or obtain the same.

Figure 4:
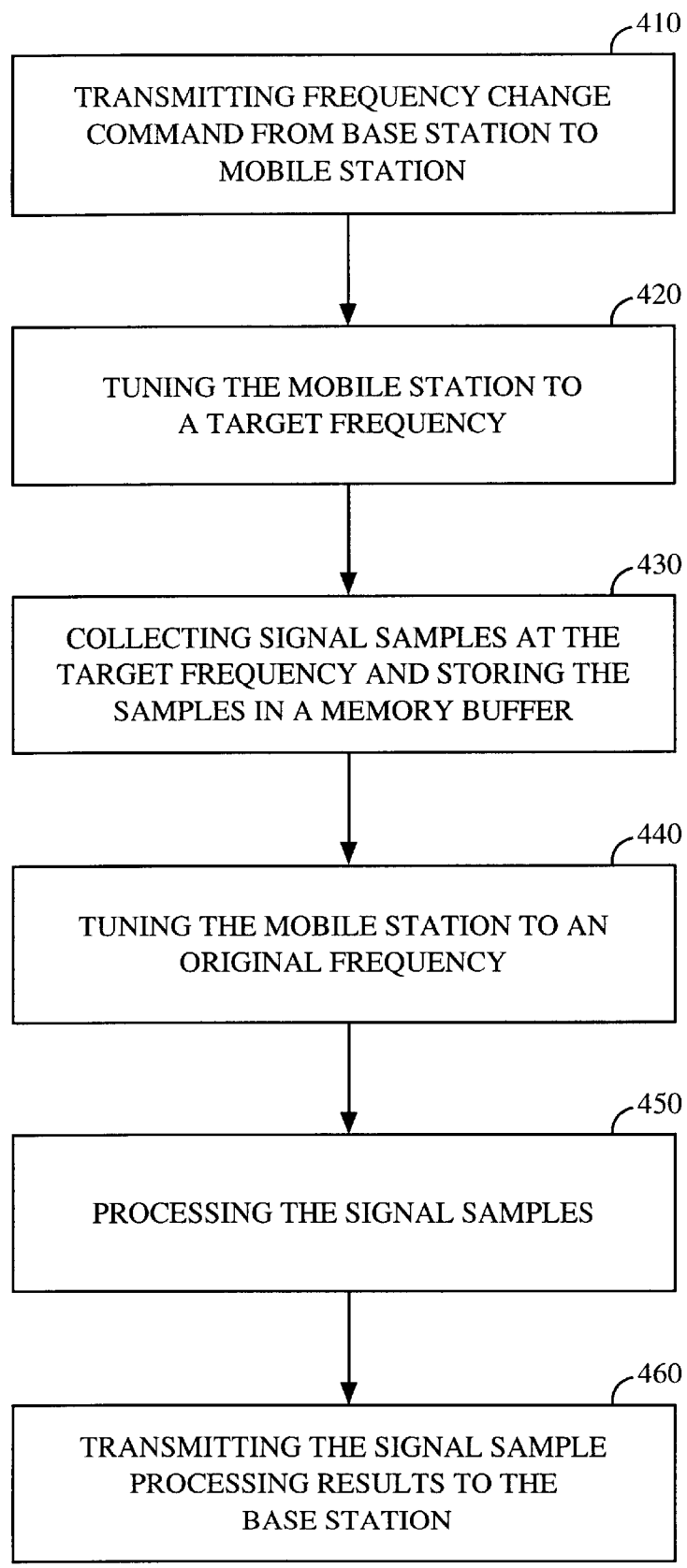
FIG. 4 is a flowchart of a method for performing a frequency search excursion under an embodiment of the invention.

The foregoing method is illustrated in FIG. 4 as a routine 400 that begins in step 410 where the base station 106*a* transmits a frequency change command to the mobile station 102 under a Candidate Frequency Search Request Control Message as defined by TIA/EIA-95-B Standard incorporated by reference. In response to this command, the mobile station 102 tunes to the target frequency f2 under step 420.

In step 430, the mobile station 102 collects signal samples at the target frequency f2 and locally stores the samples in the memory buffer 207. Under step 440, the mobile station 102 tunes back to the first frequency f1 and processes the signal samples stored in the memory buffer 207 under step 450. Note, steps 440 and 450 can be performed concurrently.

After the signal samples are processed as described above, the mobile station 102 under step 460 transmits the signal sample processing results to the base station 106*a*.

Minimizing Impact of Search Excursion on Current Frame

When the mobile station tunes to another frequency f2 to perform an inter-frequency search, forward link symbols transmitted by the base station during the $t_{search}$ time period cannot be received by the mobile station. Similarly, the mobile station does not transmit during $t_{search}$ and the base station loses reverse link symbols during the $t_{search}$ time period. To minimize the impact of this loss on both the current forward and reverse link frames, the mobile and base stations increase the amount of power allocated to the other symbols of the forward-error-correction-encoded and interleaved frame of symbols impacted by the search excursion. For the frame to be demodulated correctly, the additional amount of power required for symbols not impacted by the search excursion is a function of the search excursion time $t_{search}$, as noted herein.

Forward Link Power Control During Search Visit

To overcome the loss of forward link symbols during the $t_{search}$ time period, the mobile station increases the target $E_b/N_o$ of the forward link closed-loop fast power control by $\Delta_{target}$ dB.

This new target $E_b/N_o$ is set K power control groups (PCG) before the search excursion. The required number K of previous PCGs affected before the search excursion and the required increase in target $E_b/N_o$ ($\Delta_{target}$) depends on the duration of the search excursion $t_{search}$; the longer $t_{search}$ is, the larger K. As a result of the increase in the target $E_b/N_o$, the forward link power will ramp-up prior to the inter-frequency search.

Figure 5:
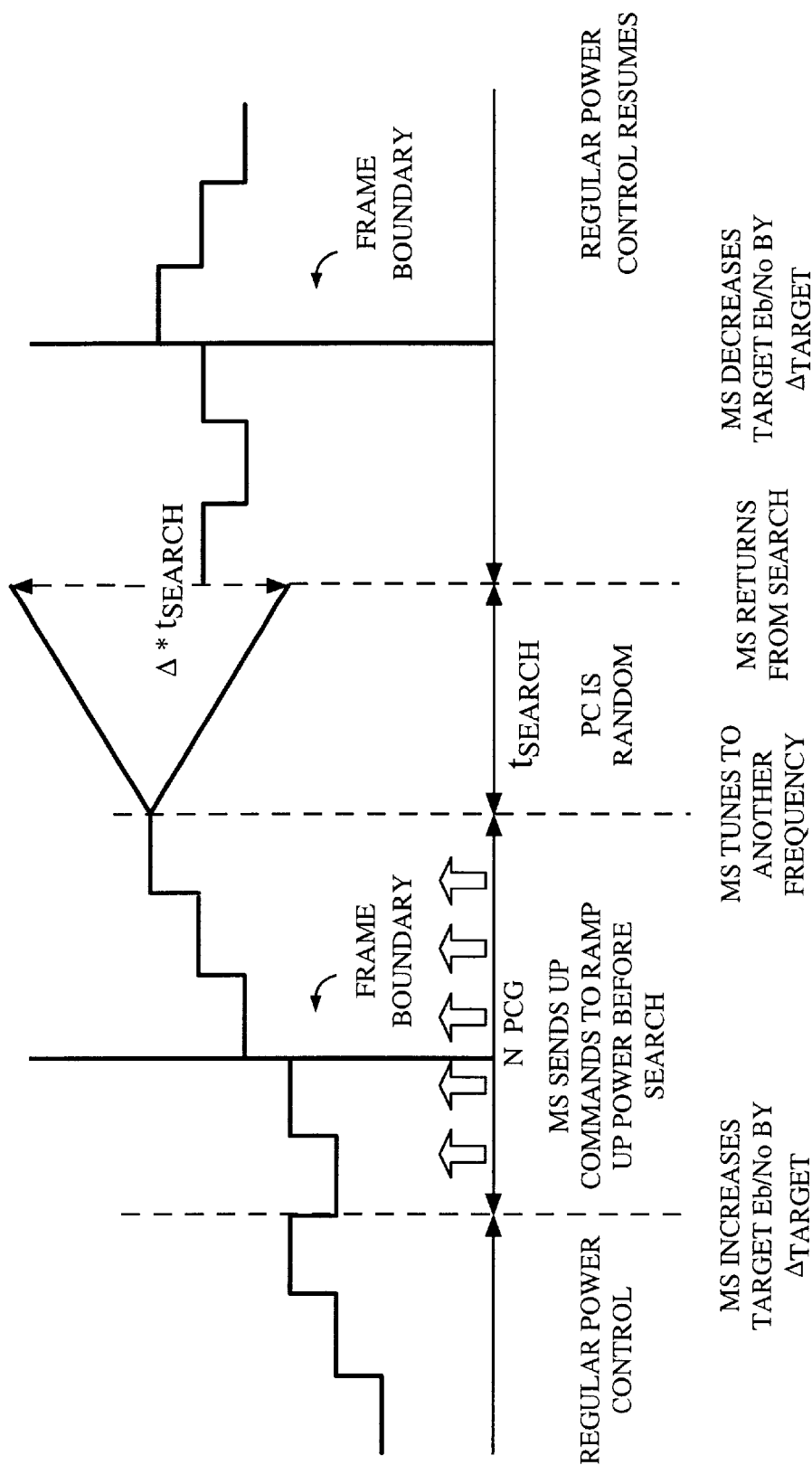
FIG. 5 is a graph of power verses time that illustrates the succession of forward link power levels related to inter-frequency search excursions.

FIG. 5 illustrates the succession of forward link power levels related to an inter-frequency search excursion. Although FIG. 5 is self-explanatory to one of ordinary skill in the relevant art, a brief explanation is provided. After the search excursion, the mobile station 102 resumes demodulation of the forward link symbols of the current frame. At this stage the mobile station 102 knows the total symbol energy received in the current frame and can compare this to the required energy per frame to achieve the target frame error rate. The mobile station 102 can use this metric to increase or decrease the target $E_b/N_o$ for the remaining power control groups of the frame. If the search excursion expands over a frame boundary, the mobile station 102 may increase its target $E_b/N_o$ during the next frame to make up for the lost symbols in the first part of the frame. Details regarding closed loop power control can be found, for example, in U.S. Pat. Nos. 6,075,974 and 5,982,760, entitled METHOD AND APPARATUS FOR ADJUSTING THRESHOLDS AND MEASUREMENTS OF RECEIVED SIGNALS BY ANTICIPATING POWER CONTROL COMMANDS YET TO BE EXECUTED and METHOD AND APPARATUS FOR POWER ADAPTATION CONTROL AND CLOSED-LOOP COMMUNICATIONS filed Nov. 20, 1996 and Jun. 20, 1997, all respectively, and assigned to the assignee of this invention.

Reverse Link Power Control During Search Visit

While searching on the target frequency f2, the base station 106a will lose communication with the mobile station 102 and will not receive symbols during the $t_{search}$ time period. To overcome the loss of those symbols, the mobile station 102 can increase the total transmission power on the reverse link by a quantity $\Delta_{search}$ dB. The quantity $\Delta_{search}$ depends on the duration of the search $t_{search}$ and corresponds to the additional required symbol energy over the remainder of the frame to overcome the loss of symbols during $t_{search}$ and still permit the base station 106a to demodulate the frame correctly. The base station 106a can inform the mobile station 102 of the maximum tolerable increase $\Delta_{search}$ dB in the message directing the mobile station to perform an inter-frequency search (e.g., in the ("FCSM")). This value can depend on the maximum tolerable interference currently determined by the base station 106a.

Figure 6:
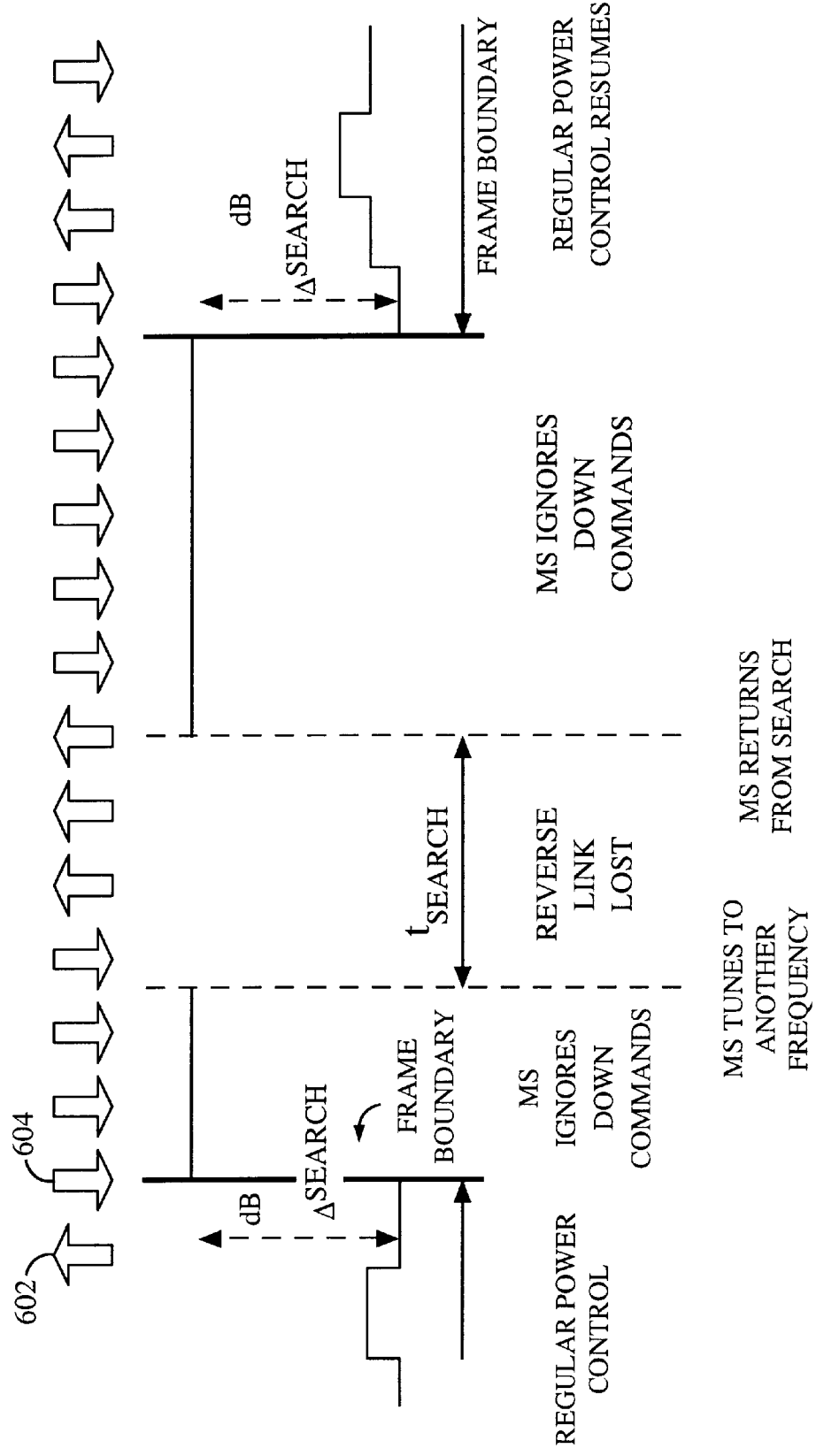
FIG. 6 is a graph of power versus time that illustrates a reverse link power increase during search excursion.

FIG. 6 illustrates the succession of reverse link power increases during a search excursion. While FIG. 6 would be self-explanatory to one of ordinary skill in the relevant art, a brief explanation is provided. During the inter-frequency search frame, transmitted with a power increase, the base station 106a will send down commands ordering the mobile station 102 to reduce its power. The mobile station 102 simply ignores those down commands until the end of inter-frequency search frame, as shown in FIG. 6. These up and down commands are represented by the large dark arrows 602, 604, respectively, in FIG. 6. If the search excursion expands over a frame boundary, the mobile station 102 can increase its total transmit power during the next frame in a fashion similar to that noted above to overcome the loss of the initial symbols of the next frame. Regular power control resumes after the frame boundary, as shown in FIG. 6.

Figure 7:
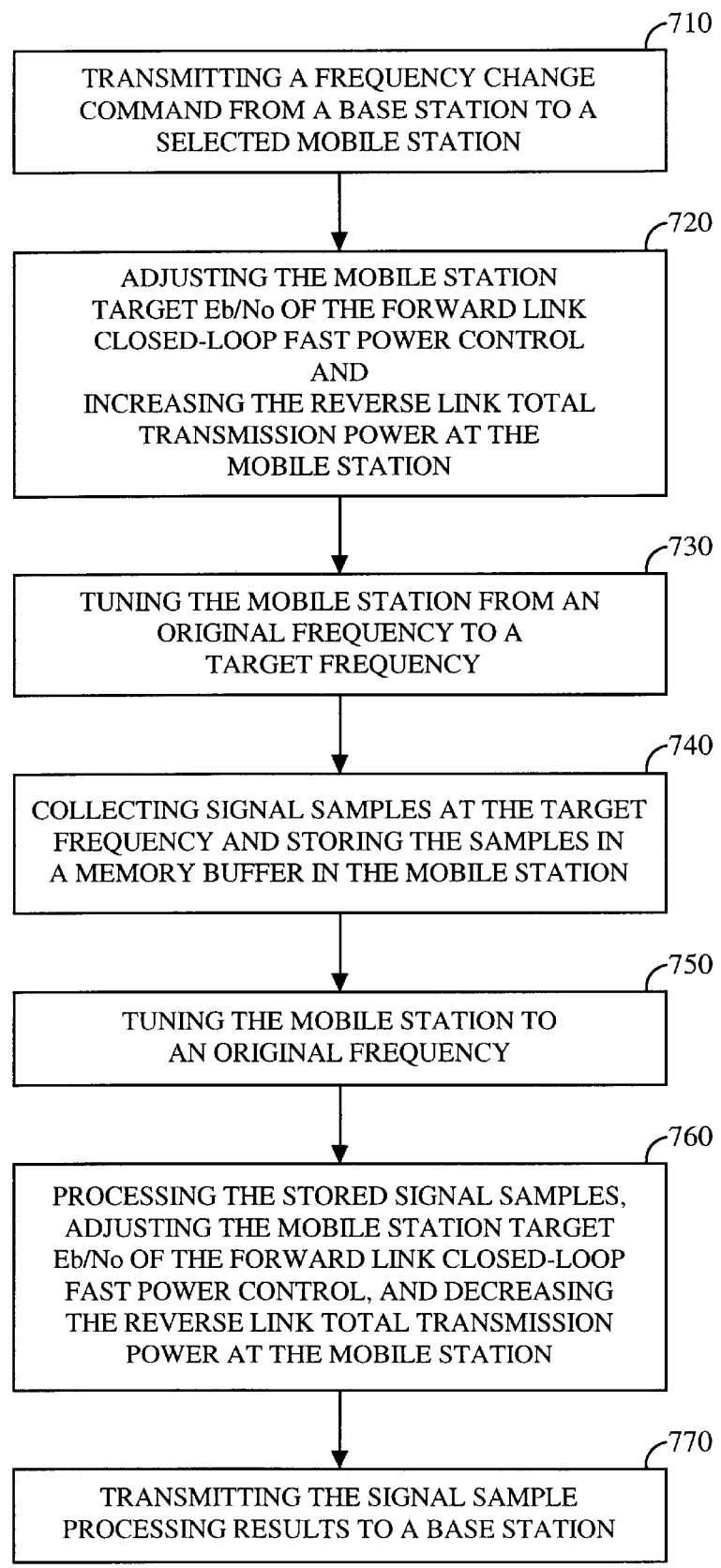
FIG. 7 is a flowchart of a method for performing a frequency search excursion while minimizing disruption of service in accordance with another embodiment of the invention.

Thus, the method described previously with respect to FIG. 4 can be modified to ensure uninterrupted communication during a search excursion. FIG. 7 shows the steps of the modified method, beginning with step 710, where the base station 106a transmits the frequency change command (FCSM) to the mobile station 102.

Before the mobile station 102 tunes to the target frequency, the target $E_b/N_o$ of the forward link closed-loop fast power control is increased from a first level to a second level as described above. The mobile station 102 increases the total transmission power on the reverse link by a quantity $\Delta_{search}$ dB, as also described above and illustrated in step 720.

The mobile station then tunes to the target frequency and collects target frequency signal samples, such as chip sample data, and stores the signal samples in the memory 207, under steps 730–740.

In step 750, the mobile station 102 tunes back to the first frequency when the collection of signal samples is complete. The mobile station 102 processes the signal samples in the memory buffer and resumes communication with the base station 106a at the first frequency f1. In resuming communications, the mobile station 102 adjusts the target $E_b/N_o$ of the remaining power control groups in the frame, and then reduces the target $E_b/N_o$ by $\Delta_{target}$ and the reverse link total transmission power resumes regular control, as illustrated in step 760.

Finally, under 770, the signal sample processing results, such as at the pilot strength measurements, are transmitted to the base station.

The base station 106a and the mobile station 102 can be configured to accomplish the foregoing process. Source code to accomplish the foregoing can be readily generated by those of ordinary skill in this technology based on the detailed description provided herein.

While a preferred embodiment of the invention has been illustrated and described above, it is to be understood that various changes may be made therein without departing from the spirit and scope of the invention. For example, the mobile station 102 can use the state of its long code mask to select a starting position within a frame to perform the inter-frequency search. The mobile station 102 can select a randomization period such that the inter-frequency search would typically not expand over a frame. Randomizing the search excursion position between different mobile stations will reduce the reverse link interference and will decrease the total power requirement on the forward link. Consequently, the invention is to be limited only by the scope of the claims that follow.

Although specific embodiments of, and examples for, the invention are described herein for illustrative purposes, various equivalent modifications can be made without departing from the scope of the invention, as will be recognized by those skilled in the relevant art. For example, embodiments are generally shown and described as being implemented in software and performed by a processor. Such software can be stored on any suitable computer-readable medium, such as microcode stored in a semiconductor chip, computer-readable disk, or downloaded and stored from a server. The invention could equally be implemented in hardware, such as by a DSP or ASIC.

The teachings provided herein of the invention can be applied to other communications systems, not necessarily the illustrated communication system described above. For example, while the invention has been generally described above as being employed in the CDMA communication system 100, the invention is equally applicable to other digital or analog cellular communication systems. The invention can be modified to employ aspects of the systems, circuits, and concepts of the various patents and standards described above, all of which are incorporated by reference.

These and other changes can be made to the invention in light of the above detailed description. In general, in the following claims, the terms should not be construed to limit the invention to the specific embodiments disclosed in the specification and the claims. Accordingly, the invention is not limited by the disclosure, but instead its scope is to be determined entirely by the following claims.

What is claimed is:

1. A method for minimizing frequency search time in a wireless communications system having a user station exchanging communications with a base station, the method comprising:

receiving a frequency change command at the user station to switch from receiving signals on an original frequency to receiving signals on a target frequency;

configuring the use station to overcome loss of forward link symbols during sampling of the target frequency by increasing a target $E_b/N_o$ on the forward link power control of the user station;

tuning the user station to the target frequency and collecting and storing signal samples from the target frequency;

tuning the user station to the original frequency and processing the stored samples; and transmitting sample processing results to a base station.

2. A method for performing frequency search excursions in a wireless communications system having a selected user station and a base station, the method comprising:

transmitting a communication from a base station that directs a selected user station to perform a frequency search excursion to a target frequency;

receiving the communication at the selected user station;

configuring the user station to overcome loss of forward link symbols during sampling of the target frequency by increasing a target $E_b/N_o$ on the forward link power control of the user station;

tuning the selected user station to the target frequency from forward and reverse communications on an original frequency;

collecting signal sample data at the target frequency and storing the signal sample data in memory in the selected user station;

tuning the selected user station to resume forward and reverse communications on the original frequency while processing the signal sample data to determine pilot strength measurements; and transmitting the pilot strength measurements from the selected user station to the base station.

3. The method of claim 2, wherein transmitting a frequency change command from the base station further comprises transmitting a maximum tolerable increase in the reverse link total transmission power from the user station; and wherein tuning the user station from the original frequency to the target frequency further comprises determining the duration of the search excursion time, determining the required number of power control groups and forward and reverse links affected by the search excursion, increasing the target $E_b/N_o$ of the forward link closed-loop fast power control in the affected power control groups; and increasing the reverse link total transmission power at the user station to a level no greater than the maximum tolerable increase prior to the search excursion; and wherein tuning the user station from the target frequency to the original frequency further comprises adjusting the target $E_b/N_o$ of the forward link closed-loop fast power control for the remaining power control groups, and reducing the reverse link total transmission power level at the user station.

4. The method of claim 2, wherein tuning the user station to a target frequency further includes adjusting the user station target $E_b/N_o$ of the forward link closed-loop fast power control and increasing the reverse link total transmission power at the user station; and further wherein tuning the user station to the original frequency further comprises decreasing the reverse link total transmission power, and adjusting the user station target $E_b/N_o$ of the forward link closed-loop fast power control.

5. The method of claim 2, wherein tuning the user station from the original frequency to the target frequency further comprises increasing the user station target $E_b/N_o$ of the forward link closed-loop fast power control by an amount that is a function of search excursion time to cause the forward link power to increase prior to the user station tuning to the target frequency, and increasing the reverse link total transmission power to a level determined by the base station and communicated in the frequency change command; and the tuning of the user station from the target frequency to the original frequency further comprises adjusting the target $E_b/N_o$ of remaining power control groups of a received frame and reducing the reverse link total transmission power of the user station.

6. The method of claim 2, wherein receiving the communication and tuning the selected user station further comprises increasing the amount of power allocated to other symbols of a frame impacted by the frequency search excursion to minimize the effect of the loss of forward and reverse link symbols during the frequency search excursion.

7. A wireless communication user station for exchanging communications with a base station, the user station comprising:

means for transmitting signals;

means for receiving signals, including means for tuning to selected signal frequencies;

means for configuring the user station to overcome loss of forward link symbols during sampling of the target frequency by increasing a target $E_b/N_o$ on the forward link power control of the user station; and means for sampling a target frequency in response to a frequency sampling command from the base station, the sampling means comprising means for storing the target frequency samples when the receiver is tuned to the target frequency; and means for processing the target frequency samples, the processing means configured to process the target frequency samples after the receiving means has resumed communications on an original frequency.

8. The user station of claim 7, wherein the receiving means is configured to minimize the loss of forward and reverse symbols of the current forward and reverse link frames by increasing the amount of power allocated to the other symbols of the frame impacted by the sampling of the target frequency and adjusting the amount of power allocated to the symbols not impacted by the sampling of the target frequency.

9. The user station of claim 7, wherein the receiving means is configured to minimize the loss of forward and reverse symbols of the current forward and reverse link frames by increasing the amount of power allocated to the other symbols of the frames impacted by the search excursion and adjusting as a function of the amount of sampling time the amount of power allocated to the symbols not impacted by the search excursion.

10. The user station of claim 7, wherein the receiving means is configured to overcome the loss of forward link symbols during the sampling of the target frequency by increasing the target $E_b/N_o$ of the forward link closed-loop fast power control of the user station.

11. The user station of claim 7, wherein the receiving means is configured to overcome the loss of forward link symbols during the sampling of the target frequency by increasing the target $E_b/N_o$ of a predetermined number of forward link closed-loop fast power control groups prior to sampling of the target frequency.

12. The user station of claim 7, wherein the receiving means is configured to overcome the loss of forward link symbols during the sampling of the target frequency by increasing the target $E_b/N_o$ of a predetermined number of forward link closed-loop fast power control groups prior to sampling of the target frequency, and after sampling of the target frequency, adjusting the target $E_b/N_o$ of the remaining power control groups in the frames.

13. The user station of claim 7, wherein the receiving means is configured to overcome the loss of forward link symbols during the sampling of the target frequency by increasing the target $E_b/N_o$ of a predetermined number of forward link closed-loop fast power control groups prior to sampling of the target frequency and after sampling the target frequency, adjusting the target $E_b/N_o$ of the remaining power control groups in the frames by comparing total symbol energy received in the current frame with the required energy per frame to achieve target frame error rate.

14. The user station of claim 7, wherein the receiving means is configured to overcome the loss of forward link symbols during the sampling of the target frequency by increasing the target $E_b/N_o$ of a predetermined number of forward link closed-loop fast power control groups prior to the sampling of the target frequency, and after the sampling of the target frequency, adjusting the target $E_b/N_o$ of the remaining power control groups in the frames by comparing total symbol energy received in the current frame with the required energy per frame to achieve target frame error rate; the receiving means further configured to increase the total transmission power on the reverse link prior to sampling of the target frequency to a maximum tolerable level as determined by the base station and communicated to the user station as part of the sampling command, the receiving means further configured to ignore commands from the base station to reduce the total transmission power during the sampling of the target frequency and to resume normal total transmission power control after the last frame boundary.

15. A method for hard-frequency handoff in a wireless communications system having a user station exchanging communications with a base station, the method comprising:
  transmitting a communication from the base station that directs the user station to search a target frequency;
  receiving at the user station the communication from the base station to search the target frequency;
  adjusting the amount of power allocated to frame symbols not impacted by the search of the target frequency, and increasing the amount of power allocated to the other frame symbols impacted by the search of the target frequency by increasing a target $E_b/N_o$ on the forward link power control of the user station;
  searching the target frequency for signal samples and storing the signal samples in memory in the station;
  resuming communications on an original frequency while processing the signal samples and readjusting power allocation for all symbols to a normal level; and
  reporting process results of the signal samples to the base station.

16. The method of claim 15, wherein the adjusting the amount of power allocated to the frame symbols not impacted by the search and increasing the amount of power allocated to the other frame symbols impacted by the search comprises increasing the target $E_b/N_o$ of a predetermined number of forward link closed-loop fast power control groups prior to searching, and after searching the target frequency, adjusting the target $E_b/N_o$ of the remaining power control groups and the frames.

17. The method of claim 15, wherein adjusting the amount of power allocated to the frame symbols not impacted by the search and increasing the amount of power allocated to the other frame symbols impacted by the search comprises increasing the target $E_b/N_o$ of a predetermined number of forward link closed-loops fast power control groups as a function of a Δ target dB and wherein readjusting power allocation further comprises adjusting the target $E_b/N_o$ of the remaining power control groups in the frames by comparing total symbol energy received in the current frame with the required energy per frame to achieve target frame error rate.

18. The method of claim 15, wherein adjusting the amount of power allocated to the frame symbols not impacted by the search and increasing the amount of power allocated to the other frame symbols impacted by the search, comprises increasing the target $E_b/N_o$ of a predetermined number of forward link closed-loop fast power control groups as a function of a Δ target dB and increasing the reverse link total transmission power to a maximum tolerable level as determined by the base station and communicated to the user station; and
  wherein readjusting power allocation further comprises adjusting the target $E_b/N_o$ of the remaining power control groups in the frames by comparing total symbol energy received in the current frame with the required energy per frame to achieve target frame error rate, and to resume normal reverse link total transmission power control after the last frame boundary.

19. The method of claim 15, wherein processing the signal samples comprises determining pilot signal strength; and reporting processing results further comprises reporting pilot strength to the base station.

20. A wireless communication user station for exchanging communications with a base station, the user station comprising:
  a transmitter;
  a receiver; and
  a processor configured to sample a target frequency in response to a frequency sampling command from the base station, the processor further configured to overcome loss of forward link symbols during sampling of the target frequency by increasing a target $E_b/N_o$ on the forward link power control of the user station, store the target frequency samples in a memory when the receiver is tuned to the target frequency, and to process the target frequency samples and transmit the target frequency sample processing results to the base station when the receiver has resumed communications on a first frequency.

21. The user station of claim 20, wherein the processor is configured to overcome the loss of forward link symbols during the sampling of the target frequency by increasing the target $E_b/N_o$ of a predetermined number of forward link closed-loop fast power control groups prior to sampling of the target frequency, and after sampling the target frequency, to adjust the target $E_b/N_o$ of the remaining power control groups in the frames by comparing total symbol energy received in the current frame with the required energy per frame to achieve target frame error rate.

22. The user station of claim 20, wherein the processor is configured to overcome the loss of forward link symbols during the sampling of the target frequency by increasing the target $E_b/N_o$ of a predetermined number of forward link closed-loop fast power control groups prior to sampling of the target frequency, and after sampling the target frequency, to adjust the target $E_b/N_o$ of the remaining power control groups in the frames by comparing total symbol energy received in the current frame with the required energy per frame to achieve target frame error rate; the processor further configured to increase the total transmission power on the reverse link while sampling the target frequency.

23. The user station of claim 20, wherein the processor is configured to overcome the loss of forward link symbols during the sampling of the target frequency by increasing the target $E_b/N_o$ of a predetermined number of forward link closed-loop fast power control groups prior to sampling of the target frequency, and after sampling the target frequency, to adjust the target $E_b/N_o$ of the remaining power control groups in the frames by comparing total symbol energy received in the current frame with the required energy per frame to achieve target frame error rate; the processor further configured to increase the total transmission power on the reverse link while sampling the target frequency, the processor adjusting the total transmission power on the reverse link to a maximum tolerable level as determined by the base station and communicated to the sampling means as part of the sampling command.

24. The user station of claim 20, wherein the processor is configured to overcome the loss of forward link symbols during the sampling of the target frequency by increasing the target $E_b/N_o$ of a predetermined number of forward link closed-loop fast power control groups prior to sampling of the target frequency, and after sampling the target frequency, adjusting the target $E_b/N_o$ of the remaining power control groups in the frames by comparing total symbol energy received in the current frame with the required energy per frame to achieve target frame error rate; the processor further configured to increase the total transmission power on the reverse link while sampling the target frequency, the processor adjusting the total transmission power on the reverse link to a maximum tolerable level as determined by the base station and communicated to the processor as part of the sampling command; the processor further configured to ignore commands from the base station to reduce the total transmission power during the sampling of the target frequency.

25. A method for minimizing frequency search time in a wireless communications system, comprising:
receiving a frequency change command at a mobile station to switch from receiving a signal on an original frequency to receiving a signal on a target frequency;
tuning the user station to the target frequency and collecting and storing signal samples;
configuring the user station to overcome loss of forward link symbols during sampling of the target frequency by increasing target $E_b/N_o$ on the forward link power control of the user station;
tuning the user station to the original frequency and processing the stored samples; and
reporting to a base station results of the processing.

26. A wireless communication system, comprising:
means for transmitting a communication from a base station that directs a selected user station to perform a frequency search excursion to a target frequency;
means for receiving the communication at the selected user station and tuning the selected user station to the target frequency from forward and reverse communications at a first frequency;
means for configuring the user station to overcome loss of forward link symbols during sampling of the target frequency by increasing a target $E_b/N_o$ on the forward link power control of the user station;
means for collecting signal samples at the target frequency and storing the signal samples in memory in the selected user station;
means for tuning the selected user station to the first frequency and resuming forward and reverse communications while processing the stored signal samples to calculate pilot strengths; and
transmitting the calculated pilot strength from the selected user station to the base station.

27. The system of claim 26 wherein the receiving means is configured to overcome the loss of forward link symbols during the sampling of the target frequency by increasing the target $E_b/N_o$ of the forward link closed-loop fast power control of the user station.

28. The system of claim 26 wherein the receiving means is configured to overcome the loss of forward link symbols during the sampling of the target frequency by increasing the target $E_b/N_o$ of a predetermined number of forward link closed-loop fast power control groups prior to tuning to the target frequency.

29. The system of claim 26 wherein the receiving means is configured to overcome the loss of forward link symbols during the sampling of the target frequency by increasing the target $E_b/N_o$ of the predetermined number of forward link closed-loop fast power control groups prior to tuning to the target frequency, and is further configured after tuning from the target frequency to adjust the target $E_b/N_o$ of the remaining power control groups in the frames.

30. The system of claim 26 wherein the receiving means is configured to overcome the loss of forward link symbols during the sampling of the target frequency by increasing the target $E_b/N_o$ of a predetermined number of forward link closed-loop fast power control groups prior to tuning to the target frequency, and is further configured after tuning from the target frequency to adjust the target $E_b/N_o$ of the remaining power control groups in the frames by comparing total symbol energy received in the current frames with a required energy per frame to acheve target frame error rate.

31. The system of claim 26 wherein the receiving means is configured to overcome the loss of forward link symbols during the sampling of the target frequency by increasing the target $E_b/N_o$ of a predetermined number of forward link closed-loop fast power control groups prior to tuning to the target frequency, and to adjust the target $E_b/N_o$ of the remaining power control groups in the frames after tuning from the target frequency by comparing total symbol energy received in the current frame with the required energy per frame to achieve target frame error rate; the receiving means further configured to increase the total transmission power on the reverse link while sampling the target frequency.

32. The system of claim 26 wherein the receiving means is configured to overcome the loss of forward link symbols during the sampling of the target frequency by increasing the target $E_b/N_o$ of a predetermined number of forward link closed-loop fast power control groups prior to tuning to the target frequency, and after tuning from the target frequency to adjusting the target $E_b/N_o$ of the remaining power control groups in the frames by comparing total symbol energy received in the current frame with the required energy per frame to achieve target frame error rate; the receiving means further configured to increase the total transmission power on the reverse link while sampling the target frequency, the receiving means adjusting the total transmission power on the reverse link to a maximum tolerable level as determined by the base station and communicated to the receiving means as part of the sampling command.

33. The system of claim 26 wherein the receiving means is configured to overcome the loss of forward link symbols during sampling of the target frequency by increasing the target $E_b/N_o$ of a predetermined number of forward link closed-loop fast power control groups prior to tuning to the target frequency, and after tuning from the target frequency to adjusting the target $E_b/N_o$ of the remaining power control groups in the frames by comparing the total symbol energy received in the current frame with the required energy per frame to achieve target frame error rate; the receiving means being further configured to increase the total transmission power on the reverse link while sampling the target frequency, the receiving means adjusting the total transmission power on the reverse link to a maximum tolerable level as determined by the base station and communicated to the signal sample collecting means as part of the sampling command, the receiving means further configured to ignore commands from the base station to reduce the total transmission power during sampling of the target frequency.

\* \* \* \* \*